(12) United States Patent
Krohn

(10) Patent No.: US 7,436,734 B2
(45) Date of Patent: Oct. 14, 2008

(54) SHAPED HIGH FREQUENCY VIBRATORY SOURCE

(75) Inventor: Christine E. Krohn, Houston, TX (US)

(73) Assignee: Exxonmobil Upstream Research Co., Houston, TX (US)

( * ) Notice: Subject to any disclaimer, the term of this patent is extended or adjusted under 35 U.S.C. 154(b) by 0 days.

(21) Appl. No.: 10/550,406

(22) PCT Filed: Feb. 13, 2004

(86) PCT No.: PCT/US2004/004334

§ 371 (c)(1),
(2), (4) Date: Sep. 21, 2005

(87) PCT Pub. No.: WO2004/095073

PCT Pub. Date: Nov. 4, 2004

(65) Prior Publication Data

US 2006/0250891 A1    Nov. 9, 2006

(51) Int. Cl.
*G01V 1/00* (2006.01)
*G01V 1/155* (2006.01)

(52) U.S. Cl. .......................................... 367/43; 367/189
(58) Field of Classification Search ................... 367/43, 367/189
See application file for complete search history.

(56) References Cited

U.S. PATENT DOCUMENTS

| | | | | |
|---|---|---|---|---|
| 4,348,749 A | * | 9/1982 | Galbraith, Jr. ................. | 367/46 |
| 4,607,353 A | * | 8/1986 | Muir ............................ | 367/39 |
| 4,608,673 A | * | 8/1986 | Lazear ........................ | 367/43 |
| 4,630,242 A | * | 12/1986 | Done ........................... | 367/73 |
| 4,646,274 A | * | 2/1987 | Martinez ...................... | 367/41 |
| 4,688,198 A | * | 8/1987 | Wiggins ....................... | 367/46 |
| 5,142,498 A | | 8/1992 | Duren .......................... | 367/15 |
| 5,241,513 A | * | 8/1993 | Kerekes et al. ................ | 367/39 |
| 5,253,217 A | * | 10/1993 | Justice et al. ................. | 367/46 |
| 5,347,494 A | | 9/1994 | Andersen ...................... | 367/42 |
| 5,384,752 A | * | 1/1995 | Duren et al. .................. | 367/38 |
| 5,400,299 A | * | 3/1995 | Trantham ..................... | 367/38 |

(Continued)

OTHER PUBLICATIONS

Krohn et al. HFVS: Enhanced data quality through technology integration. Geophysics. vol. 71. No. 2 (Mar.-Apr. 2006). p. E13-E23.*

(Continued)

*Primary Examiner*—Deandra M Hughes
(74) *Attorney, Agent, or Firm*—ExxonMobil Upstream Research Co. Law Dept.

(57) ABSTRACT

The present invention is a method of processing seismic data in which one or more seismic vibrators are activated with one or more pilot signals and vibrator motions are recorded along with seismic data. Vibrator signatures are computed from measured vibrator motions, such as the ground force signal. A desired impulse response is specified from either a measured vibrator motion or from test data or field data from a location near the location from which the seismic data was acquired. A deconvolution filter is computed from the impulse response and the vibrator signature. Alternatively, a single separation and deconvolution filter is derived from the impulse response and from vibrator signatures from multiple vibrators and sweeps. The deconvolution or deconvolution and separation filter is used to process the seismic data. The vibrators are then moved to a new location, and the activation is repeated.

47 Claims, 12 Drawing Sheets

U.S. PATENT DOCUMENTS

| | | | | |
|---|---|---|---|---|
| 5,410,517 | A | | 4/1995 | Andersen ............ 367/75 |
| 5,550,786 | A | * | 8/1996 | Allen ............ 367/48 |
| 5,703,833 | A | | 12/1997 | Allen ............ 367/46 |
| 5,715,213 | A | | 2/1998 | Allen ............ 367/48 |
| 5,719,821 | A | | 2/1998 | Sallas ............ 367/41 |
| 5,721,710 | A | | 2/1998 | Sallas ............ 367/41 |
| 5,790,473 | A | | 8/1998 | Allen ............ 367/57 |
| 5,822,269 | A | | 10/1998 | Allen ............ 367/41 |
| 6,049,507 | A | | 4/2000 | Allen ............ 367/21 |
| 6,148,264 | A | | 11/2000 | Houck et al. ............ 702/14 |
| 6,151,556 | A | | 11/2000 | Allen ............ 702/18 |
| 6,161,076 | A | | 12/2000 | Barr et al. ............ 702/17 |
| 6,418,079 | B1 | | 7/2002 | Fleure ............ 367/40 |
| 6,687,619 | B2 | | 2/2004 | Moerig et al. ............ 702/14 |
| 6,766,256 | B2 | | 7/2004 | Jeffryes ............ 702/14 |
| 6,842,701 | B2 | * | 1/2005 | Moerig et al. ............ 702/14 |
| 7,050,356 | B2 | * | 5/2006 | Jeffryes ............ 367/41 |
| 2002/0091487 | A1 | * | 7/2002 | Moerig et al. ............ 702/2 |
| 2005/0122840 | A1 | * | 6/2005 | Haldorsen ............ 367/57 |
| 2006/0018192 | A1 | * | 1/2006 | Jeffryes et al. ............ 367/41 |
| 2006/0050611 | A1 | * | 3/2006 | Borresen ............ 367/24 |
| 2006/0158962 | A1 | * | 7/2006 | Jeffryes ............ 367/41 |
| 2007/0091721 | A1 | * | 4/2007 | Jeffryes ............ 367/41 |

OTHER PUBLICATIONS

Mewhardt et al. Does it Matter What Kind of Vibroseis Deconvolution is Used? CSEG Geophysics 2002.*

Ziolkowski, Anton. Simplified wavelet estimation using source-signature measurements. Jan. 2000. The Leading Edge.*

Baeten, G. J. M. et al. (1988) "Seismic Vibrator Modeling", *Geophysical Prospecting*, 36, pp. 22-65.

Bickel, S. H. (1984) "The effects of noise on minimum-phase Vibroseis deconvolution", *Geophysics*, 47, pp. 1174-1184.

Rietsch, E. (1981) *"Reduction of Haromic Distortion in Vibratory Source Records,"* Geophysical Prospecting, 29, pp. 178-188.

Yilmaz, O. (1987) *Seismic Data Processing*, table of contents only.

* cited by examiner

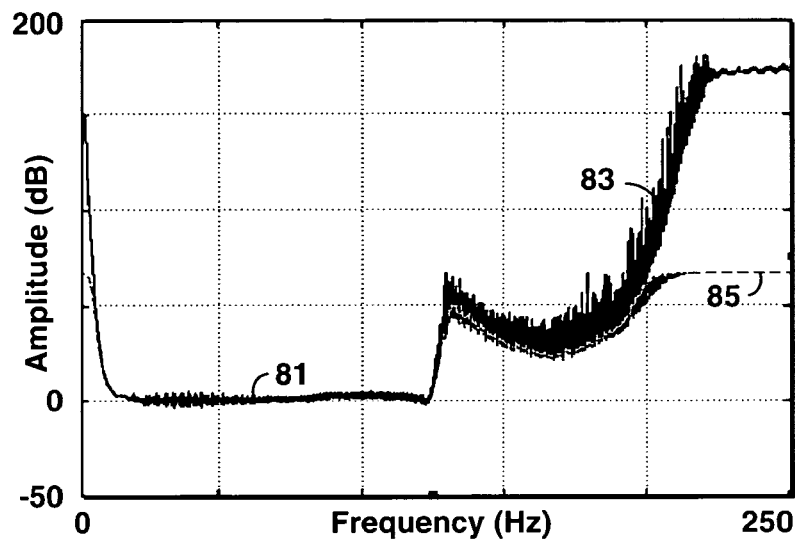
FIG. 8
*(PRIOR ART)*
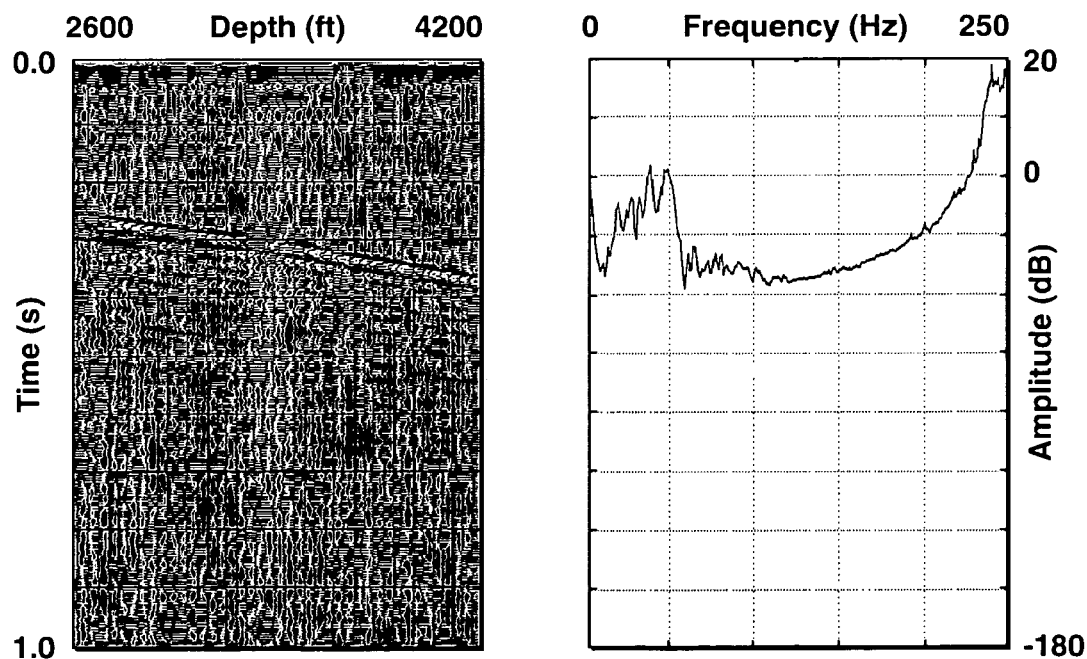
FIG. 9A
*(PRIOR ART)*
FIG. 9B
*(PRIOR ART)*

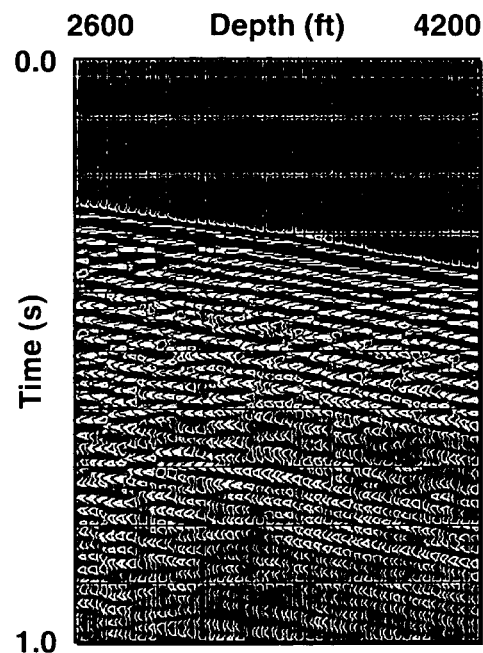
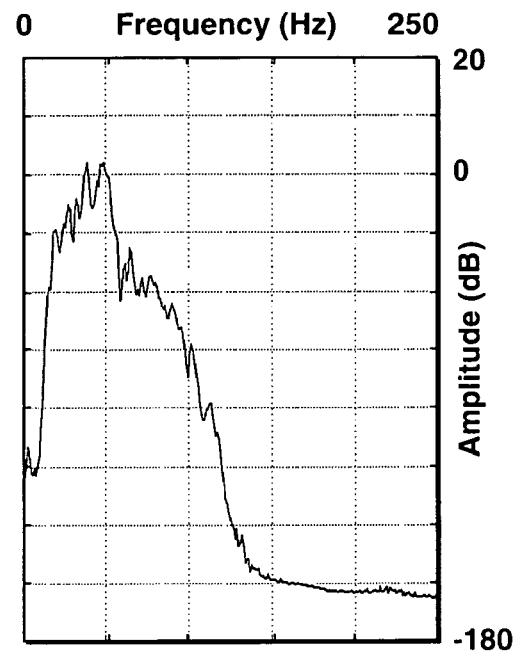
FIG. 10A　　　　　FIG. 10B
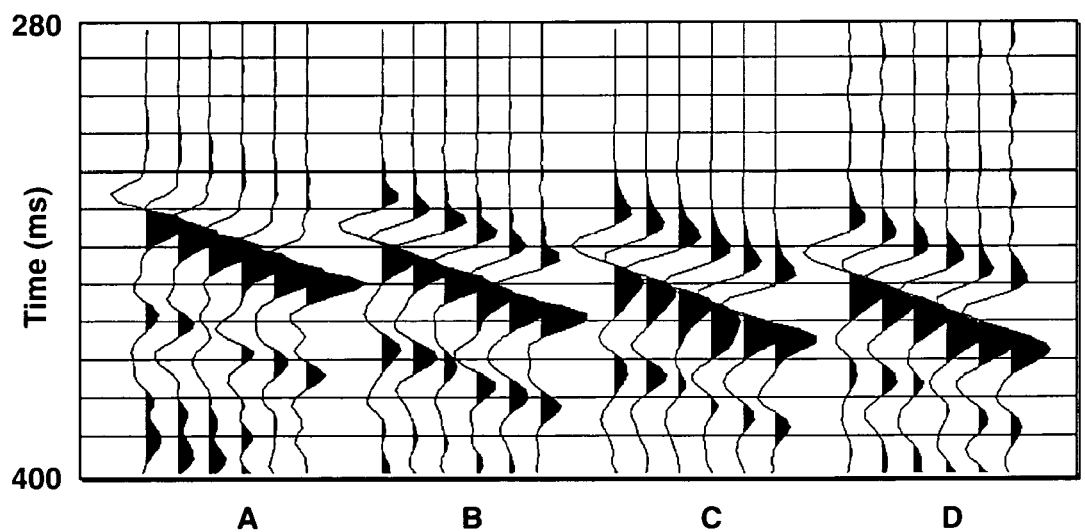
FIG. 11

SHAPED HIGH FREQUENCY VIBRATORY SOURCE

FIELD OF THE INVENTION

This invention relates to the field of seismic data acquisition and processing of vibratory source data. Specifically, this invention is a method of optimizing vibratory source data to accurately represent the output that would be derived from impulse sources.

BACKGROUND OF THE INVENTION

Seismic vibrators are commonly used to produce the source signals necessary in the geophysical exploration for hydrocarbons. In field use, seismic vibrators are excited with a pilot signal that is typically a wave train that varies in frequency, referred to as a sweep, and lasts several seconds. The excitation of the vibrator is typically adjusted by a feedback loop controlled by a ground force signal that is computed from signals measured by accelerometers on the base plate and on the reaction mass of the source.

In this application of seismic vibrators, seismograms are generated by cross correlating the data recorded at various receiver locations with the pilot signal. This cross-correlation step compresses the impulse response of the data from the several seconds associated with the sweep to a few tens of milliseconds and thereby better approximates the signal that would be recorded by an ideal impulsive source. This step is followed by standard seismic data processing steps, such as surface consistent statistical deconvolution, static corrections, noise filtering, bandpass filtering, and imaging.

Five categories of problems with conventional seismic vibrator technology have long been recognized in industry. First, the cross-correlation process results in a pulse with undesirable characteristics, including a widened main lobe and sidelobes that appear as oscillations on either side of the main lobe. Second, the output is mixed phase, as a result of combining the correlation process, which results in a zero phase wavelet, with the earth attenuation filter and recording instruments, which are minimum phase.

This leads to several problems. For example, correlated data, unlike impulsive-source data, do not have well-defined arrival times. In addition, such data are no longer causal. Other processing techniques, such as statistical or spiking deconvolution, assume that the data are causal and minimum phase, and for that reason the processing results may not be accurate. Third, the pilot signal used in the correlation is generally substantially different from the actual signal put into the ground. The actual signal contains harmonics and other nonlinearities arising from the mechanics of the vibrator and its coupling with the ground. Processing the data with the pilot signal does not allow those harmonics and nonlinearities to be removed, which therefore appear as noise in the processed data. Fourth, acquiring seismic data is expensive and a major cost is associated with the number of source stations that can be used. Traditional vibrator technologies record only one source station at a time. Methods that allow acquisition using multiple source stations simultaneously would speed acquisition and reduce costs. Fifth, to increase the energy put into the ground two or more vibrators are typically used at each source station. However, spacing limitations result in the multiple vibrators forming an array that can limit the high frequencies in the data and thereby reduce resolution. Elevation changes may also limit the ability to correct for time shifts, also referred to as static corrections, between the vibrators. As further described in the next several paragraphs, industry has focused a substantial amount of effort in attempting to overcome these limitations.

The U.S. patents issued to Trantham, U.S. Pat. No. 5,400,299 and Andersen, U.S. Pat. No. 5,347,494 disclose methods that principally address the first category of problems. The methods result in improved impulse wavelet shapes. Trantham's disclosure also provides a causal and minimum phase impulse after removal of the vibrator pilot signal. However, processing is done with the pilot, which is only an approximation of the signature imparted into the ground. Also, Trantham's approach preferably requires pre-whitening the signal, in which white noise is added, to stabilize a spectral division from which the vibrator signature deconvolution filter is generated. This step prevents numerical errors in the division, but also may cause phase distortions and adds a precursor to the processed seismic data.

Andersen's method involves the choice of a sweep power spectrum that leads to an impulse response with a simple shape and an optimum length after correlation. Unlike conventional sweeps, which start around 8 Hz, Andersen's sweep starts at frequencies near 1 Hz. The presence of these lower frequencies results in a more desirable wavelet. This solution, however, only addresses the first of the problems noted above. In addition, the use of high-resolution wavelets requires that the sweep rate changes rapidly with time and is not realizable with standard hydraulic vibrators.

U.S. Pat. No. 5,550,786 issued to Allen discloses a method that uses a measured accelerometer signal or signals, such as the ground force, from each vibrator and sweep in an inversion process instead of a correlation with a pilot signal. The measured signals are related to the actual signal imparted into the ground by a transfer function of minimum phase, which is obtained by the process of minimum phase statistical deconvolution, which is commonly used in processing land data. Steps include inversion (also referred to as spectral division), bandpass filtering, and spiking deconvolution. A model trace is processed to make a phase correction of the deconvolved data.

Allen addresses the first three shortcomings discussed above. However, Allen's method applies an inverse filter by the process of spectral division, and it is recognized that a problem with such inverse filters is that at frequencies where the measured signals are small, the filter will apply a large gain and amplify any recorded noise. If the signal is zero, then inversion will be unstable. The data can be pre-whitened by adding a small amount of constant noise to stabilize the inversion, but the added noise can distort the phase of the data. Because processing techniques such as spiking deconvolution assumes that input data are minimum phase, the output results may not be predictable when such distortion is present. Allen attempts to solve these problems by using bandpass filters to reduce the noise outside the vibrator sweep band, and by processing a model trace in order to be able to calculate a phase correction. As will be understood to those skilled in the art, a preferable method would avoid the use of bandpass filters and phase corrections by eliminating the need to pre-whiten the data.

U.S. Pat. Nos. 5,719,821 and 5,721,710 issued to Sallas et al. discuss a matrix inversion scheme to separate the outputs from individual vibrators. The number of sweeps can be equal to or greater than the number of vibrators. This method solves a set of linear equations, which includes the measured motions from each vibrator and each sweep, to determine an optimal filter for inversion and separation. Although Sallas addresses the shortcomings listed above, the problems with inversion and phase errors discussed above in relation to Allen remain unsolved. U.S. Pat. No. 6,161,076 issued to Barr et al (2000) is similar to the prior work of Allen and Trantham. Barr misstates that Allen is using a single accelerometer signal instead of the ground force signal, and claims the use of a filter to convert the data to short-duration wavelets, as did Trantham. It is understood in the art that this process is equivalent to inversion followed by a bandpass filter, and thus the problems noted above are unaddressed. Barr specifically discloses using the harmonics or non-linear distortion to construct a wavelet of equal or greater bandwidth than the sweep. This approach also involves retention of noise components that reduce the quality of the subsequently processed data. Finally, Barr discloses phase encoding the sweeps for multiple vibrators, and the use of a different set of separation filters for each sweep before stacking the outputs.

U.K. Patent 2,359,363 to Jeffryes (2000) restates the Sallas disclosures, but with the addition of a filter to remove harmonics from the data and from measured vibrator signatures. As noted, filters are undesirable, as they inadequately remove harmonics and other non-linearities and thus reduce the quality of subsequently processed data.

There is a need for a method whereby seismic vibrator data can be acquired and processed in a manner that accurately represents the data, which would be derived from an impulse source. The method should involve use of a deterministic deconvolution that derives from measured vibrator motions. The method should not require addition of white noise to stabilize the processing computations. The method should not require use of a post-processing bandpass filter to eliminate harmonics and noise. The method should retain the correct phase of the underlying data to ensure subsequent processing techniques produce accurate results. The method should be applicable to arrays of more than one vibrator and provide for the separation of data recorded from multiple vibrators simultaneously. The present invention addresses these needs.

SUMMARY

The present invention is a method of processing seismic data in which one or more seismic vibrators are activated with one or more pilot signals and vibrator motions are recorded along with seismic data. Vibrator signatures are computed from measured vibrator motions, such as the ground force signal. A desired impulse response is specified from either a measured vibrator motion or from test data or field data from a location near the location from which the seismic data was acquired. A deconvolution filter is computed from the impulse response and the vibrator signature. Alternatively, a single separation and deconvolution filter is derived from the impulse response and from vibrator signatures from multiple vibrators and sweeps. The deconvolution or deconvolution and separation filter is used to process the seismic data. The vibrators are then moved to a new location, and the activation is repeated. The impulse response is determined based on an iterative process in which time and frequency domain characteristics of it and a sample filter are analyzed. After application of a separation and deconvolution filter, data are obtained that are suitable for correcting intra-array effects and for improved noise suppression.

BRIEF DESCRIPTION OF THE DRAWINGS

The features of the present invention will become more apparent from the following description in which reference is made to the drawings appended hereto.

FIG. 3 depicts a typical pilot sweep signal, ground force signal, and vibrator signature signal where

FIG. 8 depicts the inversion operator used in the prior art method of Allen.

FIG. 9 depicts processed seismic data results for the prior art method of FIG. 8.

FIG. 10 depicts seismic data results deriving from an embodiment of the method of the present invention.

FIG. 11 depicts first arrival data recorded for geophones in a well and various seismic preprocessing methods, wherein FIG. 11a shows conventionally correlated data, FIG. 11b shows data according to the method of Allen, FIG. 11c shows the results from an embodiment of the present invention, and FIG. 11d shows impulsive-source data.

FIG. 12 depicts CMP gather data where

FIG. 13 depicts the reflector alignments for the two examples of FIG. 12 after summing the four neighboring traces to form a source array wherein

FIG. 14 depicts a comparison of noise suppression results wherein

FIG. 15 depicts the results of processing the data for the two examples of FIG. 14 in which

Figure 1:
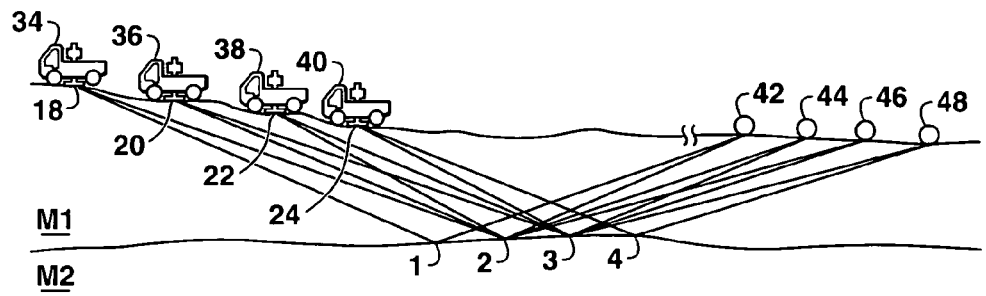
FIG. 1 depicts a typical data acquisition method that may be used to acquire data for use in embodiments of the present invention.

Changes and modifications in the specifically described embodiments can be carried out without departing from the scope of the invention, which is intended to be limited only by the scope of the appended claims.

DESCRIPTION OF THE INVENTION

The current invention is a method for improving the quality of vibratory source data. More specifically, the present invention is a method to acquire and process vibrator seismic data which involves performing a vibrator signature deconvolution using vibrator signatures derived from measured vibrator motions. Deterministic deconvolution is used instead of the traditional process of cross correlation and a measured vibrator signature is used instead of the pilot signal.

The deconvolution filters derived according to the method of the present invention remove the vibrator signature from the data, including harmonics and nonlinear noise, and replace that signature with the desired impulse response. The filters are designed so as not to amplify noise for frequencies not included in the vibrator sweep. In addition, the phase distortion caused by the conventional process of adding noise to stabilize the inversion calculation is reduced.

The method ensures that the output of the initial processing of the vibrator data is similar to that which would be generated by an impulse source. That initial processing compresses the long wavetrains associated with the vibrator sweep into a short-duration impulse response with desired phase and amplitude characteristics, thereby allowing first break times to be picked reliably. The present method ensures that the phase of the vibrator data is optimized for subsequent processing steps, thereby eliminating the need for subsequent phase corrections and filtering, and improving the signal-to-noise quality of the data. The method uses source signatures for each vibrator and each sweep to improve the fidelity and resolution of the data, and to allow the response of each vibrator to be separated. Separating the response of each vibrator allows the vibrators to be treated as unique source points, which facilitates intra-array static corrections and noise suppression.

The method of the present invention builds on prior work in the field of vibrator data processing, but incorporates characteristics not previously recognized to improve the quality of the deconvolved seismic data. As noted above, for example, Trantham disclosed the deconvolution to a minimum phase wavelet with a spectrum that goes to zero at both high and low frequencies to match traditional sweeps, and Anderson disclosed the characteristic that the shape of the sweep can be used to reduce the length of the pulse.

A characteristic of the present method is that the impulse response amplitude spectrum tends to zero faster than does the amplitude spectrum of the vibrator signature—at both high and low frequencies—to prevent the deconvolution filter from becoming unstable in the spectral division step. Prior art methods avoided that instability by adding noise to the signal and by using an appropriately designed bandpass filter. However, the addition of noise distorts the phase and adds a precursor to the deconvolved data, and bandpass filters may be inadequate to eliminate noise, and must be carefully designed to prevent phase distortion. The method of the present invention avoids that distortion, since the impulse response is designed to be rigorously minimum phase without needing a correction, thus ensuring that subsequent processing has correct phase. In addition, prior methods, such as that of Barr, intentionally used a desired wavelet with a larger bandwidth than the sweep, which also works against the goal of retaining correct phase. Benefits of the present method include a better ability to pick first arrival times, and thereby improve the results from checkshot surveys, static correction methods, and tomographic methods. Seismic images obtained from the present method have optimum phase and facilitate excellent ties with well data.

In a multiple vibrator embodiment of the present invention, a full solution involving all components of the matrices can be generated using one filter for all sweeps in a fully coupled derivation. Prior art methods, such as Barr, use a filter for one sweep, then separate the data for that sweep. In these prior art methods, separate filters are designed to separate subsequent sweeps and separated data from the same location are stacked. This approach is equivalent to the use of only the diagonal of the matrix solution to the multivibrator application, results in a loss of data quality, and does not allow the elimination of noise or unwanted signal components. Embodiments of the present invention avoid these limitations via the full matrix solution.

In a third embodiment, the method of the present invention facilitates processing to be applied for separating the data from each vibrator into individual records. Static corrections and differential normal moveout (NMO) can then be applied to each source location. In addition, supergathers can be constructed which improve the capabilities of noise separation techniques. The data from each source location can be summed. Alternatively, data can be binned at smaller common depth point intervals prior to migration, thereby further improve imaging and focusing.

Embodiments of the present invention will be discussed in the following in association with the system diagram of FIG. 1, which depicts the geometry of the data gathering system associated with the present invention. In FIG. 1, vibrators 18, 20, 22, and 24 are located, in an on-land application, on trucks 34, 36, 38, and 40, respectively. Signals that are generated in the earth by vibrators 18, 20, 22, and 24 are reflected off interface 26 between subsurface layers IM1 and IM2 at points 1, 2, 3 and 4, respectively, and are received by receivers 42, 44, 46, and 48.

Figure 2:
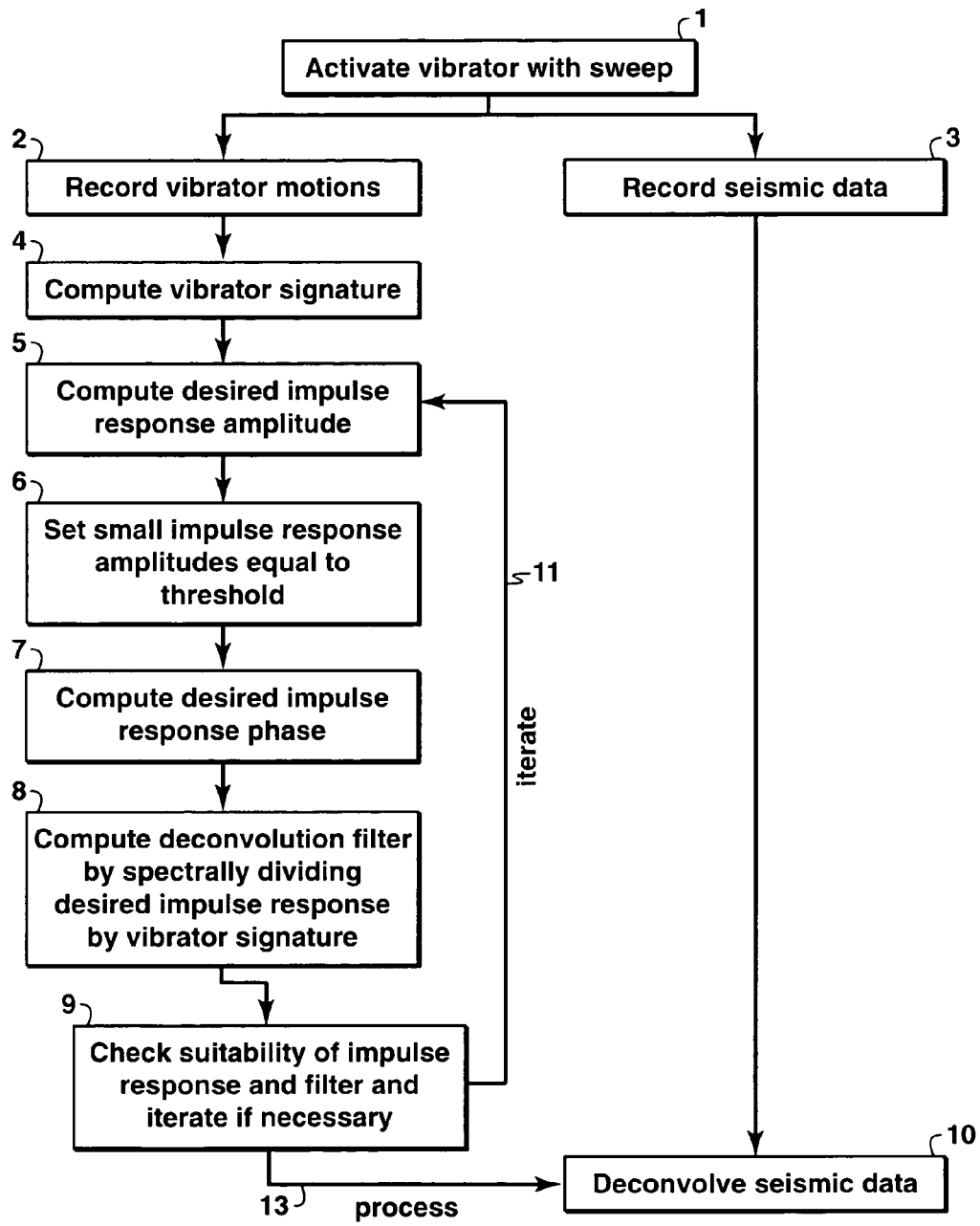
FIG. 2 depicts a flow chart of the steps for implementation of an embodiment of the present invention.

A first embodiment of the method of the present invention, as depicted in the flow chart of FIG. 2, begins with the activation of one or more vibrators with a sweep, step 1. Next, vibrator motions, step 2 and seismic data, step 3 are both recorded. Third, a vibrator signature is computed from the measured vibrator motions, step 4. Next, a desired impulse response is computed. This involves the specification of a desired impulse response amplitude spectrum, step 5 which is preferably less than or equal to the vibrator signature spectrum at all frequencies. Preferably, the amplitudes of the impulse response and the vibrator signature that fall below a small threshold value are set equal to the threshold value, step 6. Alternatively, a small amount of prewhitening noise can be added at all frequencies (Not depicted in FIG. 1). Next, a desired phase for the impulse response is calculated, step 7. A deconvolution filter is computed by spectrally dividing the calculated impulse response by the vibrator signature, step 8. An iteration 11 is performed if necessary to optimize the characteristics of the impulse response and the deconvolution filter, step 9. If iteration is necessary, step 5 is performed again as well as the steps after step 5. The deconvolution filter can then be used for the process 13 to deconvolve the received seismic signals, step 10. A characteristic of the present method is that the steps related to the computation of the impulse response and the deconvolution filter, once optimized, only have to be performed once and do not have to be repeated for the subsequent operation of the vibrators at new locations.

As will be understood to those skilled in the art, the impulse response is specified based on the objectives of the analysis to be performed. For example, for a seismic analysis focusing on a shallow target, it will be preferable to use a sharper impulse response with higher frequencies. On the other hand, a deeper target of interest may preferably require a thicker impulse response with lower frequencies, which penetrate deeper into the earth.

A first embodiment of the present invention will now be described in more detail. Initially, one or more vibratory sources are used to record either a land or a marine seismic survey, and the signals are recorded by one or more detectors, as indicated by the geometry of FIG. 1. The detectors can be at the surface as is the case for typical land surveys, suspended within water or at the water bottom as is the case for marine surveys, or down a wellbore in the case for VSP surveys. Each vibrator is preferably excited, FIG. 2, step 1, with a sweep in which the frequency of the signal increases or decreases linearly in time; however, any linear, non-linear, or random sweep may be used. Preferably, the sweep should have a low frequency limit at 8 Hz or lower. As will be understood to those skilled in the art, the lower frequencies allow for the design of minimum phase impulse responses with relatively large first lobes. The high frequency limit should be chosen after tests of different sweep bandwidths and an evaluation of target reflectors, but will generally be 60 Hz or higher. The sweep signal that is used to excite the vibrator is also referred to as the pilot signal.

Figures 3A, 3B:
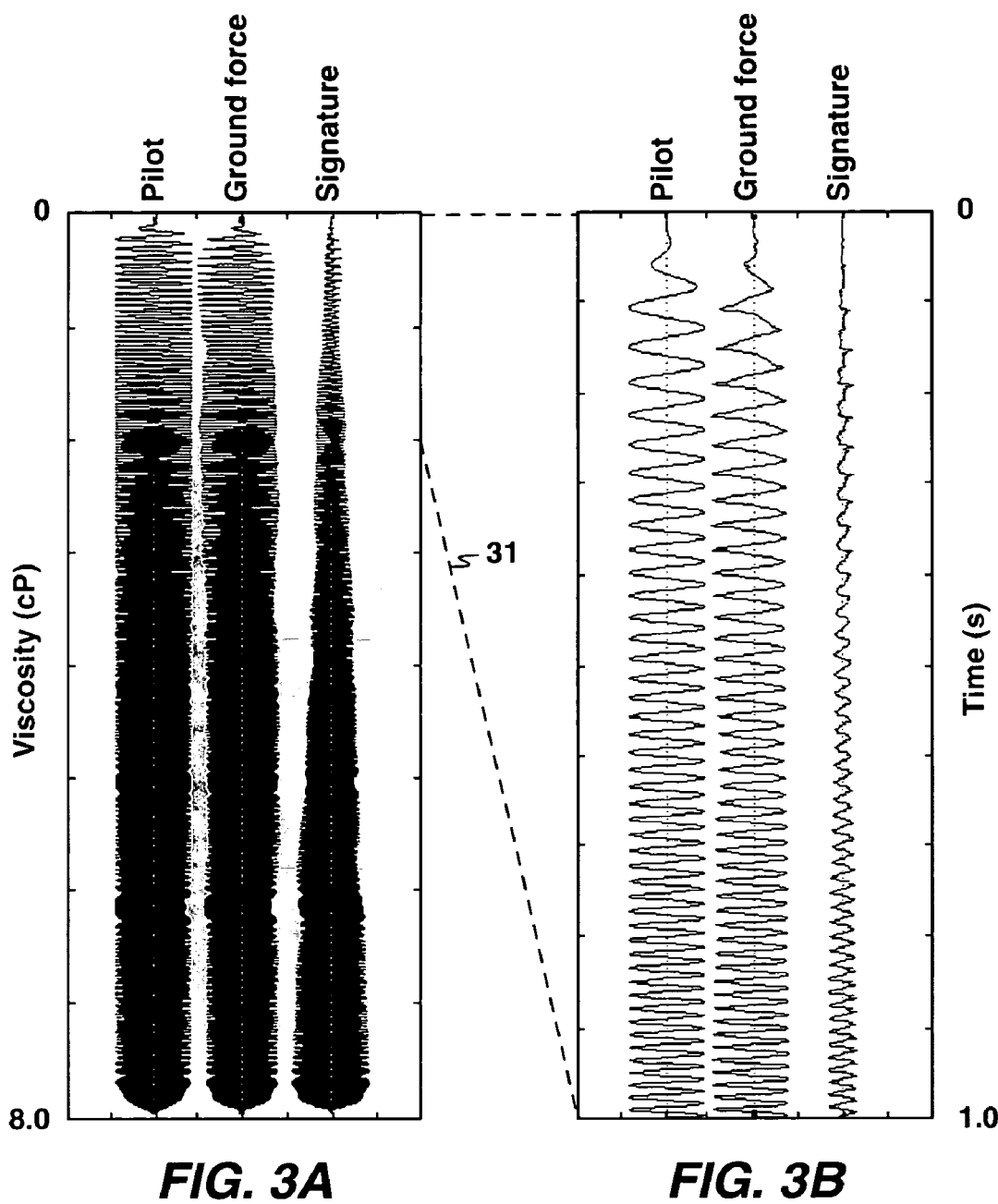
FIG. 3A depicts the entire eight second record of each signal and FIG. 3B depicts an expanded view of the first one second of each signal.

Vibrator motion measurements, FIG. 2, step 2, are made for each sweep and for each vibrator. A preferred method is to record the vibrator ground force signal, for example using a mass-weighted sum of accelerometers on the vibrator's reaction mass and baseplate or on the vibrator's baseplate stilt assembly. It will be understood that the ground force signal is the signal that is used in a feedback mode to control the vibrator excitation. It will also be understood that other accelerometer signals or force measurements could be used within the scope of the present invention. FIG. 3A shows an example 8-second pilot signal, a measured ground force signal, and a vibrator signature signal. The measured ground force is different from the pilot signal because of harmonics and coupling effects, as clearly indicated in the expanded view, FIG. 3B, of the first 1.0 seconds 31 of the respective signals.

Next, FIG. 2, step 4, a vibrator signature is derived from each measured motion. In a preferred method, the signature is computed from the time derivative of the ground force signal in the frequency domain. It is understood in the art that the signal imparted into the ground is related to the ground force signal. More specifically, the seismic data recorded by a conventional geophone is in phase with the time derivative of the ground force. Thus, the vibrator signature can be computed from the relationship $S(\omega)=i\omega G(\omega)$, where $S(\omega)$ is the Fourier transform of the vibrator signature, $G(\omega)$ is the Fourier transform of the measured ground force signal, and the multiplier $i\omega$ indicates the result in the frequency domain of the time derivative operation. If more than one vibrator is used, the vibrator signature can be derived from the average of all of the measured vibrator motions.

It is further understood that the pilot signal is an approximate to the ground force signal because of the feedback control. When measurements of vibrator motions are missing, the reference can be used in place of the ground force signal for the design of the vibrator signature. This will allow the same deconvolution to be performed, although harmonics will not be removed by the process and must be handled separately. The reference will have zero values at the low and high frequencies. Therefore, special care needs to be taken with the design of the impulse response, according to the present invention.

It is a realization of the present invention that it is important for the vibrator signature to match as closely as possible to the signal that is actually put into the ground. Use of the time derivative of the ground force signal results in less noise and artifacts and less phase distortion then using the ground force signal itself. Allen and Sallas used the ground force signal for inversion and recovered the time derivative through the process of statistical minimum phase deconvolution. They, however, required the use of a model trace for phase correction after final processing. With the present invention no such correction is required. It is within the scope of the present invention to use other modifications, such as the application of a simulated earth filter or attenuation or use of other force measurements, to improve estimates of the vibrator signature.

In the vibrator signature computation the product $i\omega G(\omega)$ may also be multiplied by a scale factor C to normalize the amplitude of the vibrator signature amplitude spectrum to unity. In addition, vibrator signature values less than a threshold value T may be set equal to that threshold T, such that $S(\omega)$ may, for example, be expressed as follows:

$$S(\omega)=i\omega CG(\omega) \text{ when } G(\omega) > T/C \qquad (1)$$

$$S(\omega)=iT/C \text{ when } G(\omega) \leq T/C \qquad (2)$$

Threshold T may be specified in absolute value terms, or as a percent of the peak value, or otherwise.

The desired impulse response is constructed next. In the frequency domain this impulse response will have the form $$I(\omega)=A_1(\omega)e^{-i(\phi_1)} \qquad (3)$$

where $A_1(\omega)$ and $\phi_1(\omega)$ are the amplitude and phase of the desired impulse, respectively. Either a measured vibrator motion from the survey being performed may be used to construct the impulse response, or the impulse response may be derived before the survey based on test data or on data from a similar location. First, FIG. 2, step 5, an impulse amplitude spectrum $A_1(\omega)$ that is appropriate for the bandwidth of the sweep signal is constructed. It will be understood that the amplitude spectrum should preferably have a peak in the middle of the sweep band and should not have sharp edges. The amplitude spectrum of Anderson is preferable. However, the spectrum of Trantham may also be used, as may other spectral forms that will be known to those skilled in the art. For convenience in the following, the amplitude spectrum will be assumed to have a peak amplitude of one, with the amplitude decreasing at higher and lower frequencies relative to the center portion of the bandwidth.

One implication of designing the amplitude spectrum based on the vibrator signature and not on the sweep signal is that the peak of the impulse amplitude spectrum may be at a different frequency from the peak of the sweep amplitude. For example, when a time derivative is employed to compute the signature, as described above, higher frequencies are boosted, thus allowing the use of a higher frequency impulse. In such cases, however, the amplitudes at the lower frequencies often will be reduced compared to that in a standard linear sweep, in order to make a shorter duration pulse. In addition, it is well-known, for example as discussed by Anderson and Trantham, that a square impulse response corresponds to a longer pulse, and tapering or shaping shortens the pulse. It is also understood that harmonics in the ground force can contribute to the tails of the frequency response, but do not serve to substantially increase the frequency or bandwidth in the desired impulse response. It is preferable that the amplitude spectrum for the desired impulse at the low and high frequencies is modified by smoothly tapering the amplitude to the threshold value at both low and high frequencies. This ensures that the filter amplitudes remain near or below unity (zero amplification) outside the sweep band of the vibrator.

Next, FIG. 2, step 6, a threshold value is selected for the impulse response amplitude spectrum, such that all values of the amplitude spectrum that fall below the threshold value are set equal to that value. Alternatively, prewhitening can be performed in which a small constant amplitude, essentially white noise, is added for all frequencies.

One reason for use of a threshold value in step 6 is to ensure accurate calculation of the impulse response phase spectrum, $\phi_1(\omega)$, FIG. 2, step 7. In this step both a minimum phase and zero phase impulse are computed from the amplitude spectrum. The minimum phase impulse is desirable for such analyses as first arrival determination. The zero phase impulse will represent that of the data after final processing and is therefore preferable for data interpretation. The zero phase impulse is computed by taking the inverse Fourier transform of the amplitude spectrum, and that computation assumes that the phase is zero throughout the bandwidth. The minimum phase impulse is computed by taking the Hilbert transform of the natural logarithm of the amplitude spectrum. Because the natural logarithm calculation requires a non-zero impulse response amplitude spectra value at all frequencies, the threshold value applied in step 6 ensures the non-zero amplitude condition throughout the bandwidth of the impulse response spectrum. The inverse Fourier transform is then used to compute the minimum phase impulse response.

The amplitude spectrum of the deconvolution filter, FIG. 2, step 8, is constructed by dividing the amplitude spectrum of the impulse response by the amplitude spectrum of the vibrator signature. A scale factor may be employed for the amplitude spectrum of the vibrator signature to ensure that the amplitude of the impulse spectrum matches that of the vibrator signature in the region of the center frequency of the bandwidth. Alternatively, the root mean square amplitude in a specified frequency window may be used to match the amplitudes. The amplitudes at the low and high frequency ends of the amplitude spectrum of the vibrator signature that fall below a threshold value are set equal to a threshold to facilitate subsequent use of the deconvolution filter. The threshold is generally set at a percent of the peak value of the spectrum, and should be equal to or larger than the threshold used for the impulse response. This threshold only affects the low and high frequencies in the subsequent processing, and is used for analytic stability.

In step 9 of FIG. 2, both the impulse response and the deconvolution filter are studied to determine whether their characteristics are suitable for the intended analysis. The time impulse response is computed by inverse Fourier transform, and is evaluated as to suitability for the analysis to be performed. The impulse time curves should have few lobes, be short in time, and the minimum phase impulse should have most of its energy in the early part of the pulse. The process is iterated until optimum impulse response spectra are obtained in terms of both the time response of the impulses and the amplification of the filter. It will be understood to those skilled in the art that this iteration process will involve evaluation of the time domain characteristics of the impulse pulses, both zero phase and minimum phase, and evaluation of the frequency domain characteristics of the impulse response amplitude spectrum, in particular in the high and low frequency portions of the spectrum.

The iteration will also include an evaluation of the frequency domain characteristics of the amplitude spectrum of the filter, again with particular emphasis on the high and low frequency portions of the spectrum. Finally, the iteration may involve selective application of the filter to actual seismic data to determine the filter's ability to eliminate noise in the processed data and the tendency of the processed data to show the presence of precursors. It will be understood that among the characteristics that will be studied in an actual seismic data test of the filter will be the ability to determine first arrival times, and the extent to which the shape of the wavelet is reasonably clear and clean. As noted above, among the general traits that the impulse amplitude spectrum will typically contain is an amplitude which is less than that of, and which trends to a zero magnitude faster than does, the vibrator signature spectrum in the low frequency range.

The impulse response will also typically trend to zero magnitude at higher frequencies at a rate sufficient that the response's magnitude is less than, and preferably set to the desired threshold value, the magnitude of the vibrator signature in the frequency range where harmonics begin to be observed. The filter resulting from the impulse response will preferably have amplitudes less than one in the low frequency range, such as below 8 Hz, and in the high frequency end above the highest frequencies in the sweep. Filters. according to the present invention will also have magnitudes in the high frequency range smaller than the amplitudes of filters using prior art methods.

In the frequency domain, the deconvolution filter $F(\omega)$ is the desired impulse response in the frequency domain $I(\omega)$ divided by the vibrator signature $S(\omega)$, or $$F(\omega) = \left(\frac{A_I(\omega)}{\omega A_g(\omega)}\right)(e^{-i(\phi_I - \pi/2 - \varphi_g)}) \tag{4}$$

where $A_I(\omega)$ and $\phi_I(\omega)$ are the amplitude and phase of the desired impulse and $A_G(\omega)$ and $\phi_G(\omega)$ are the amplitude and phase of the vibrator ground force signal. The time derivative computation for the vibrator signature is the amplitude scaling by $1/\omega$ and the phase shift by 90 degrees or $\pi/2$.

The deconvolution filter is then applied to process the seismic data from step 3 in the frequency domain, FIG. 2, step 10. It is important for minimum phase causal results that for every amplitude component of the deconvolution filter the equivalent minimum phase function is also applied. Conversely for every phase correction, such as a 90-degree phase rotation, the corresponding amplitude correction, such as $1/\omega$, must also be applied. As described above, the present invention satisfies both of these criteria.

In a second embodiment of the present invention, a vibrator signature deconvolution is performed within a matrix separation scheme for a number of vibrators operated simultaneously. In this embodiment, a plurality of vibrators is then employed to perform a number of sweeps. The number of sweeps should be equal to or greater than the number of vibrators. Measurements are made of both the motions of the vibrators and the received seismic signals. Next, vibrator signatures are computed, with the amplitudes clipped at a minimum threshold value. A desired impulse response is constructed next, as described above. A deconvolution matrix operator is generated in the frequency domain that separates the earth response for each vibrator and replaces the individual vibrator signatures with the desired impulse response. That operator is applied to deconvolve the seismic data and to separate that data according to the individual vibrator locations.

In this second embodiment, multiple sweeps, in a number equal to or greater than the number of vibrators, are simultaneously obtained from all vibrators, and a matrix separation and vibrator deconvolution method is employed. Preferably, the separation method involves use of phase encoding. For example, with three vibrators and three sweeps, a sequence may be constructed where on each sweep one vibrator is operated 90 degrees out of phase with the other vibrators, such as in the following:

| Sweep | Vibrator 1 | Vibrator 2 | Vibrator 3 |
|---|---|---|---|
| 1 | 90 | 0 | 0 |
| 2 | 0 | 90 | 0 |
| 3 | 0 | 0 | 90 |

It would also be possible to have a fourth sweep in which all vibrators time and at the same phase during one sweep, such as:

| Sweep | Vibrator 1 | Vibrator 2 | Vibrator 3 |
|---|---|---|---|
| 1 | 90 | 0 | 0 |
| 2 | 0 | 90 | 0 |
| 3 | 0 | 0 | 90 |
| 4 | 0 | 0 | 0 |

The above phase encoding may also be superimposed along with variphasing to further reduce harmonics in the case where the vibrator signature does not perfectly match the harmonics put into the ground. Variphasing involves phase rotations of a factor of $2\pi/M$ where M is the number of sweeps, as described by E. Rietsch in "*Reduction of Harmonic Distortion in Vibratory Source Records,*" *Geophysical Prospecting*, v. 29, pp. 178-188, 1981. This suppresses all harmonics up to and including order M. For use in this application the variphase angle is summed with the 90 degrees phase shift. For example for M=4 sweeps, the variphase rotations are 0, 90, 180, and 270 degrees. It is understood that the phase rotations can be performed in any order, and that higher level multiples of $2\pi$ in the above factor may be employed within the scope of the present invention. For example, adding a ninety degrees phase encoding for one vibrator at a time yields the following. The first sweep is a phase angle of 0 degrees for all vibrators except the first vibrator which sweeps at 0+90 or 90 degrees. The second sweep is at a phase of 180 for all vibrators except for the second vibrator that sweeps at 180+90 or 270 degrees, and so forth for the other two sweeps.

| Sweep | Vibrator 1 | Vibrator 2 | Vibrator 3 | Vibrator 4 |
|---|---|---|---|---|
| 1 | 90 | 0 | 0 | 0 |
| 2 | 90 | 180 | 90 | 90 |
| 3 | 180 | 180 | 270 | 180 |
| 4 | 270 | 270 | 270 | 0 |

It will be understood that other encoding methods may also be employed.

Figure 4:
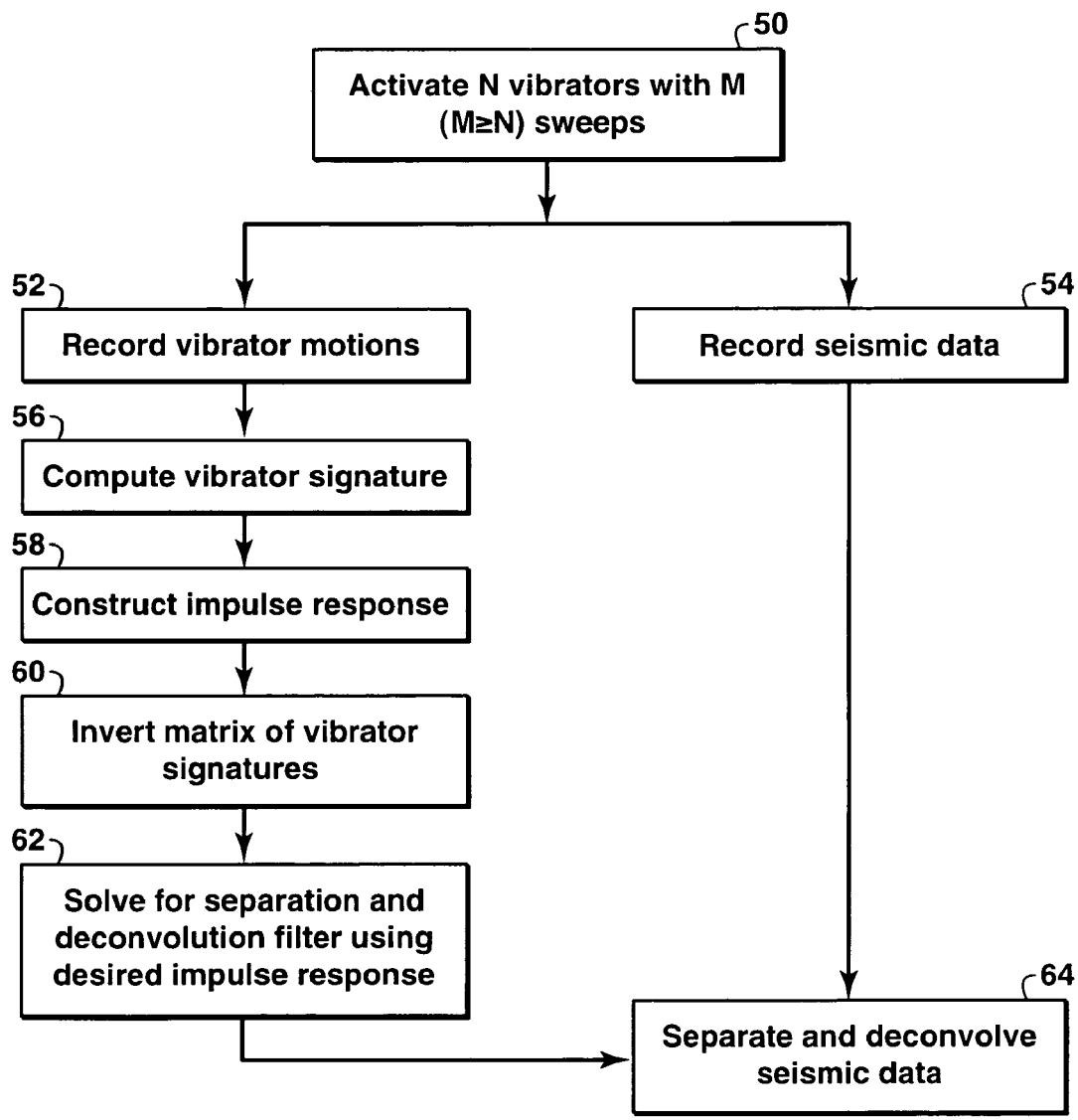
FIG. 4 depicts a flow chart of the steps for implementation of a second embodiment of the present invention.

This second embodiment will now be discussed in more detail, in association with FIG. 4. Consider N vibrators radiating M≧N sweeps into the earth, FIG. 4, step 50) and resulting in M recorded data traces (FIG. 4, step 54). It is desired to obtain, by solving a set of linear equations that finds the set of N earth reflectivities, the operator that best predicts the recorded data, based on the known MN vibrator signatures. Referring to FIG. 1, which shows four vibrators 18, 20, 22, 24 radiating a different signature s into the ground, $s_1$, $s_2$, $s_3$, $s_4$. Each signature is convolved with a different earth reflectivity sequence $e_1$, $e_2$, $e_3$, $e_4$ (For example, as resulting from the reflections at points 1, 2, 3, and 4 in FIG. 1). The earth sequence can include reflectors, multiples, and near-surface effects.

Traces $d_i(t)$ recorded at each geophone 42, 44, 46, 48 are a sum of the signature-filtered earth reflectivities under each vibrator. The data trace $d_i(t)$ recorded for sweep i is:

$$d_i(t) = \sum_{j=1}^{N} s_{ij}(t) \otimes e_j(t) \quad (5)$$

where $s_{ij}(t)$=sweep i from vibrator j and $e_j(t)$=the earth reflectivity seen by vibrator j.

In the frequency domain, this expression becomes:

$$D_i(\omega) = \sum_{j=1}^{N} S_{ij}(\omega) E_j(\omega) \quad (6)$$

which, in matrix form for M sweeps and N vibrators, can be expressed $$\begin{bmatrix} S_{11} & S_{12} & \vdots & S_{1N} \\ S_{21} & S_{22} & \vdots & S_{2N} \\ S_{31} & S_{32} & \vdots & S_{3N} \\ S_{41} & S_{42} & \vdots & S_{4N} \\ \vdots & \vdots & \vdots & \vdots \\ S_{M1} & S_{M2} & \vdots & S_{MN} \end{bmatrix} \begin{bmatrix} E_1 \\ E_2 \\ E_3 \\ \vdots \\ E_N \end{bmatrix} = \begin{bmatrix} D_1 \\ D_2 \\ D_3 \\ D_4 \\ \vdots \\ D_M \end{bmatrix} \quad (7)$$

or $$\vec{SE} = \vec{D} \quad (8)$$

If the number of sweeps is equal to the number of vibrators, the earth response can be specified in terms of a filter F:

$$\vec{E} = F\vec{D} \text{ where } F = S^{-1} \quad (9)$$

Filter F is the inverse of the matrix of vibrator signatures. In this prior art solution, inversion filter F separates the response of each vibrator and compresses the sweeps to impulses. However, as discussed above in association with a first embodiment of the present invention, it more desirable to use a deconvolution filter which incorporates a minimum phase impulse response I to determine the earth response. In matrix form, a preferred filter according to the present invention is $$F = I(S^{-1}) \quad (10)$$

Note that equation (10) is the matrix equivalent of equation (4) discussed above. With reference to FIG. 4, the vibrator motions are recorded, step 52, and vibrator signatures computed, step 56, in a manner analogous to that described above in association with FIG. 2. In FIG. 4, step 58, the impulse response is constructed and the matrix of vibrator signatures are inverted 60 according to the procedure described above in association with FIG. 2, steps 5, 6, and 7. That impulse response is used in equation (10) to determine the deconvolution filter F, step 62, and to thereafter separate and deconvolve the recorded seismic data, step 64. It will be understood to those skilled in the art that the iteration step of FIG. 1, step 9, which is not depicted in FIG. 4, may be included in multivibrator embodiments of the present invention, as desired or necessary. If there are more sweeps than vibrators, the multivibrator problem is overdetermined, and a solution must be determined by a least squares analysis. The normal equations are $$S^*S\vec{E} = S^*\vec{D}$$

$$\vec{E} = (S^*S)^{-1}S^*\vec{D} \quad (11)$$

where S* is the conjugate transpose of the vibrator signature matrix S. Equations 11 involve a prior art method that follows the disclosure of Sallas et al. in U.S. Pat. No. 5,721,710. According to the present invention however, it is preferable to use a deconvolution to remove the vibrator signature $S_{ij}$ and replace it with an impulse response 1. In this embodiment the deconvolution filter F becomes $$F = (S^*S)^{-1}(S^*1) \quad (12)$$

It will be understood to those skilled in the art that there are a number of ways to solve for filter F in equation (12). One such method uses a LU-decomposition of the matrix (S*S) and forward and back substitution to find the operator $(S^*S)^{-1}$ (S*I). Further details on this and other such methods may be found in Numerical Recipes, W.H. Press et al, Cambridge University Press, 1986. Once the filter matrix F is generated, it is applied to each data trace in the frequency domain to obtain a separated record for each vibratory source.

After the data are separated and inverted according to the method of the present invention, various processes can be applied. The method of the present invention uses the best estimate of the vibrator signature to deconvolve the data, but it is recognized that the actual energy put into the ground may be related to the computed signature by other minimum phase processes. For example, the actual signature may be affected by near-surface effects. The process of surface-consistent deconvolution or spiking deconvolution can remove these effects, as discussed by Allen. Subsequent processes which may also be applied include, but are not limited to, noise suppression, divergence correction, and static corrections.

In multi-vibrator applications of the present invention, separation of the data into unique source points for each vibrator permits special processing techniques to improve data quality. Conventionally, for example, a number of vibrators are operated simultaneously at a source station to form a source array. The array may suppress some ground-roll noise, but because the number of vibrators is usually small, noise suppression by the array is typically not very effective. Also, if the vibrators are located at different elevations, the reflections may arrive at receivers with small time differences.

The result of the time differences will limit the higher frequency components of the processed data. Finally, the trace spacing of the processed data is limited by the source and receiver station interval. By separating the data into unique source points according to embodiments of the present invention, the reflectors can be aligned before summing the data into arrays. Source static corrections for each vibrator can then be computed by any conventional method and applied to the data. In addition, correction can be made for differential normal moveout between the vibrator units because of slightly different offsets for each source. In addition, source generated noise can then be suppressed by using the unique offsets for each source.

The data recorded by a set of vibrators may be sorted into a supergather by sorting by the unique offset for each source and each receiver. The extra spatial sampling in the supergather will permit coherent noise to be removed by processes such as FK filtering that were aliased at the original spacing.

After removing noise and aligning the reflectors, array forming can be performed. Alternatively, the data can be binned into finer CDP bins using the separated source interval and input into prestack migration. For example, if the original source and receiver interval is 50 m, then the CDP interval is 25 m. However, if vibrators are used per source interval, and the records separated, then the data can be binned at 6.25-m intervals. The output can be either the finer trace spacing or a coarse spacing, whichever is desired.

The benefits of designing deconvolution filters according to embodiments of the present invention can be demonstrated using the signals of FIG. 3. Recall, that FIG. 3 shows a pilot sweep signal and a ground force signal from a standard 8-second linear sweep. The frequency range is from 8 to 128 Hz. As can be seen, the ground force is not as smooth and continuous as is the pilot because of harmonics. For reference, FIG. 3 also shows a vibrator signature, computed using the derivative of the ground force.

Figure 5:
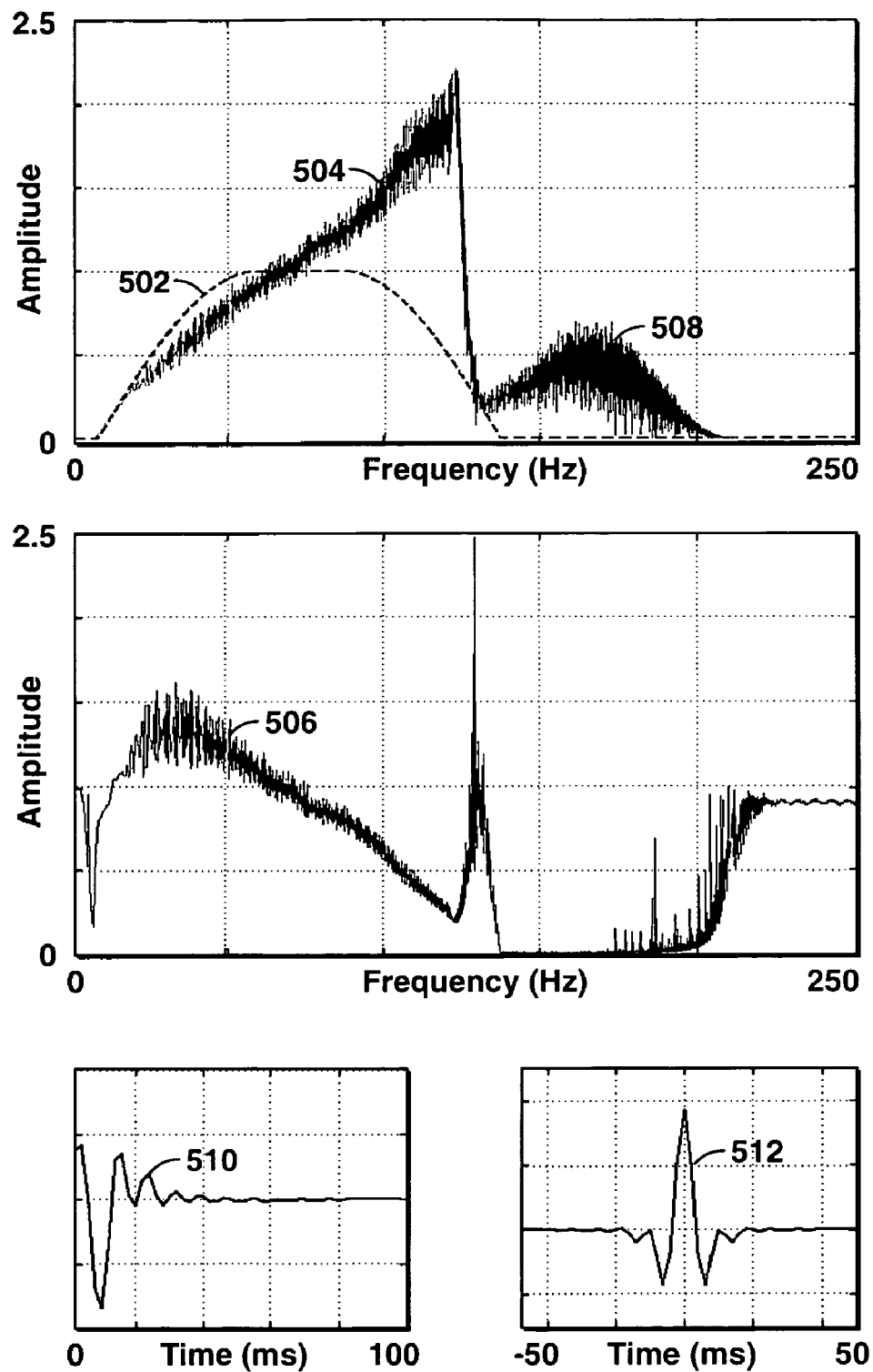
FIG. 5 depicts signal and filter characteristics related to the prior art method of Trantham.

FIG. 5 illustrates the design of a filter 506 from a vibrator signature 504 using the impulse amplitude spectrum 502 from Trantham. An advantage to this amplitude spectrum is that its magnitude goes to zero at a high and low frequency, as does the sweep. However, note that the impulse amplitude spectrum 502 is not a good match to that of the vibrator signature 504, which causes a peak in the amplitude of filter 506 at a relatively low frequency compared to the center of the bandwidth. In addition, the impulse responses 510 and 512 corresponding to the impulse amplitude spectrum 502 exhibit some ringing at longer times, and it will be understood in the art that such ringing characteristics are not desired.

Figure 6:
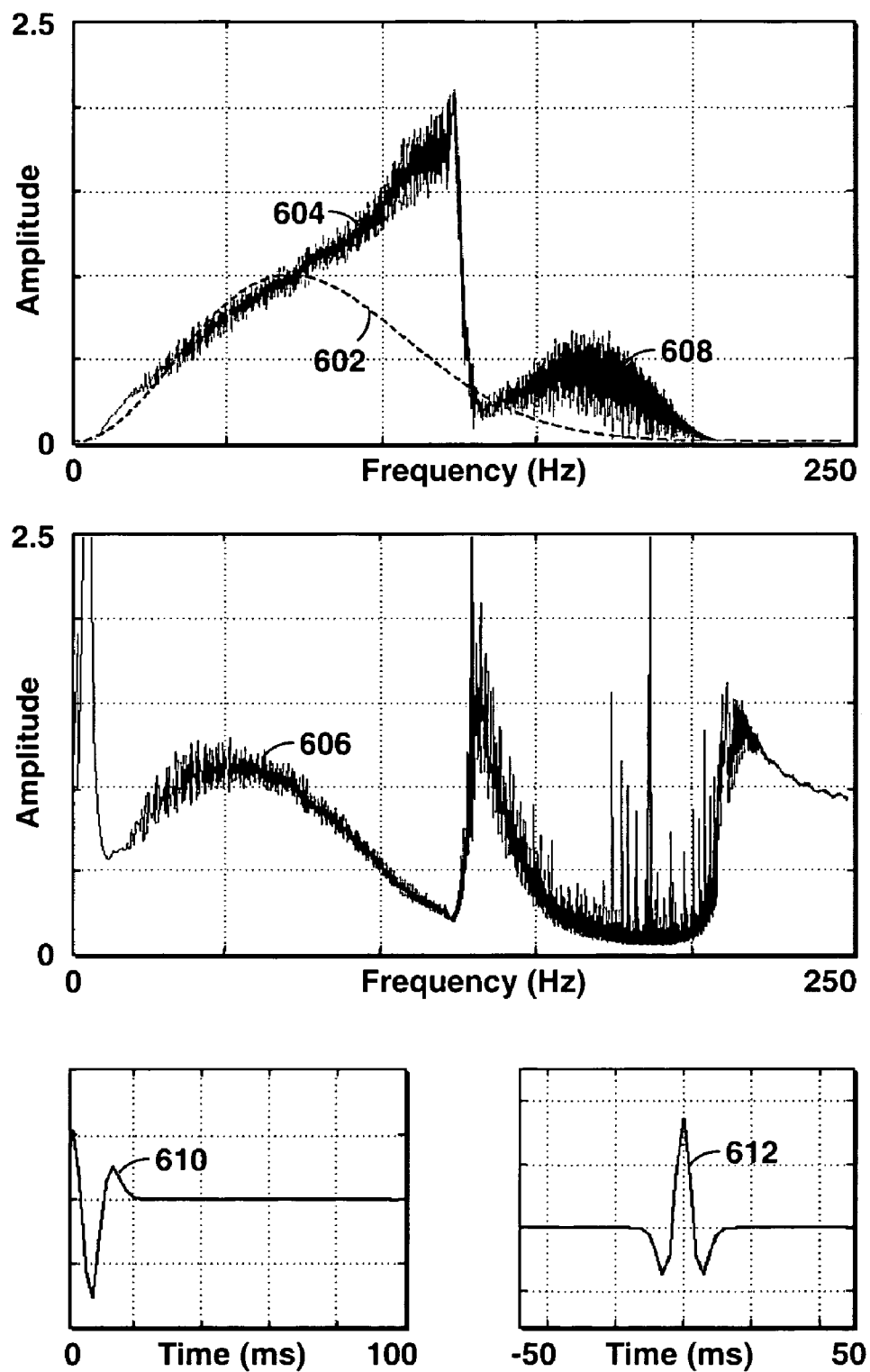
FIG. 6 depicts signal and filter characteristics related to the prior art method of Anderson.

In FIG. 6, an amplitude spectrum 602 from Anderson is used. This spectrum does not go to zero when the sweep goes to zero, and note that the amplitude spectra better matches that of the signature 704. However, it will be observed that filter 606 has substantially high amplitude peaks at both the low and high frequency ranges, with filter amplitudes much greater than 1.0. As a result the filter amplifies background noise recorded by geophones, 608. Finally, the impulse responses 610 and 612 are improved as compared to Trantham.

Figure 7:
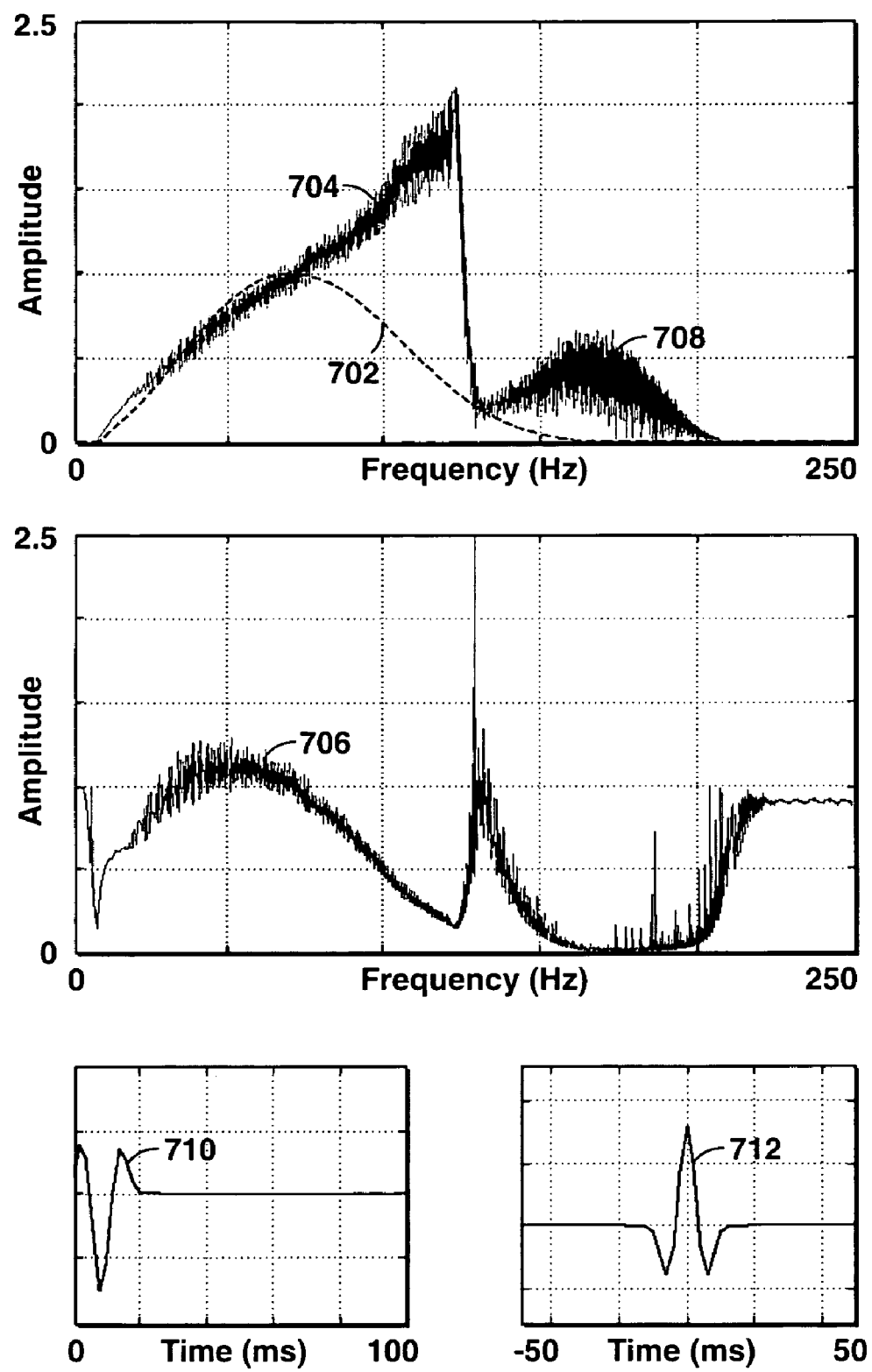
FIG. 7 depicts signal and filter characteristics related to an embodiment of the method of the present invention.

FIG. 7 depicts a filter 706 and impulse responses 710 and 712 deriving from an embodiment of the present invention. In this solution a taper to a minimum threshold value was added at both low and high frequency to amplitude spectrum 702 (The minimum threshold value is not visible in FIG. 7). In addition, the taper at the upper portion of the frequency band was altered such that spectrum 702 is below the amplitude of signature 704 for essentially the entire upper portion of the frequency range. The result is a filter 706 with substantially reduced amplitudes at both the upper and lower portions of the frequency range, and clean three-lobed impulse wavelets 710 and 712 each having a large primary lobe.

FIGS. 8-15 illustrate the advantages of use of embodiments of the present invention. FIG. 8 shows a prior art inversion designed from the sweep in FIG. 3 according to the patent to Allen. Because the sweep starts at 8 Hz and stops at 128 Hz 81, the inverse of the sweep 83 results in large gains at frequencies below 8 Hz and above 128 Hz. The inverse of the sweep and noise 85 is also shown. The result of applying this inversion operator to seismic data is shown in FIG. 9. FIG. 9a, which depicts data recorded by geophones in a well, exhibit first arrivals that are obscured by the low frequency noise that is amplified by the inversion filter. This is also evident in the spectrum in FIG. 9b, which also shows large magnitudes at low frequency. In comparison, FIG. 10 shows the result of application of a deconvolution filter according to an embodiment of the present method to the same geophone well data.

The data in FIG. 10a are clean and noise-free, clearly showing first-arrivals and reflections. The spectrum in FIG. 10b shows minimal signal energy outside the sweep band of 8-128 Hz. Thus, there is no need for subsequent filtering to remove noise at the low and high frequencies, an improvement of the present invention over the prior art.

As discussed above, the conventional method for stabilizing an inversion filter is to prewhiten the signature by adding white noise, resulting in an inversion filter as shown in FIG. 8. However, with prewhitening, an amplitude correction is made to the filter without a corresponding phase correction. Although for small added noise amplitudes, less than 1 percent, the effect may be small, higher noise levels, in the range of 3 to 5 percent, may be needed to prevent large gains at the lower and higher frequencies. The result is phase distortion and precursors in the processed data. It will be understood in the art that there should be no precursor for first arrivals with truly minimum phase data. FIG. 11 depicts first arrival data for various preprocessing method, and further demonstrates the benefits of the present invention. FIG. 11d shows the results from impulsive-source data recorded by geophones in a well. FIG. 11a shows conventionally correlated data, and the poor match to the impulsive-source data is clearly evident. FIG. 11b involved an inversion according to the method of Allen, and although the match to the impulsive-source data is improved the result is still noisy and shows a precursor. FIG. 11c shows the results of applying a deconvolution filter according to an embodiment of the present invention. Precursor energy is small and the wavelets are a good match to the impulsive-source data.

Figure 12A:
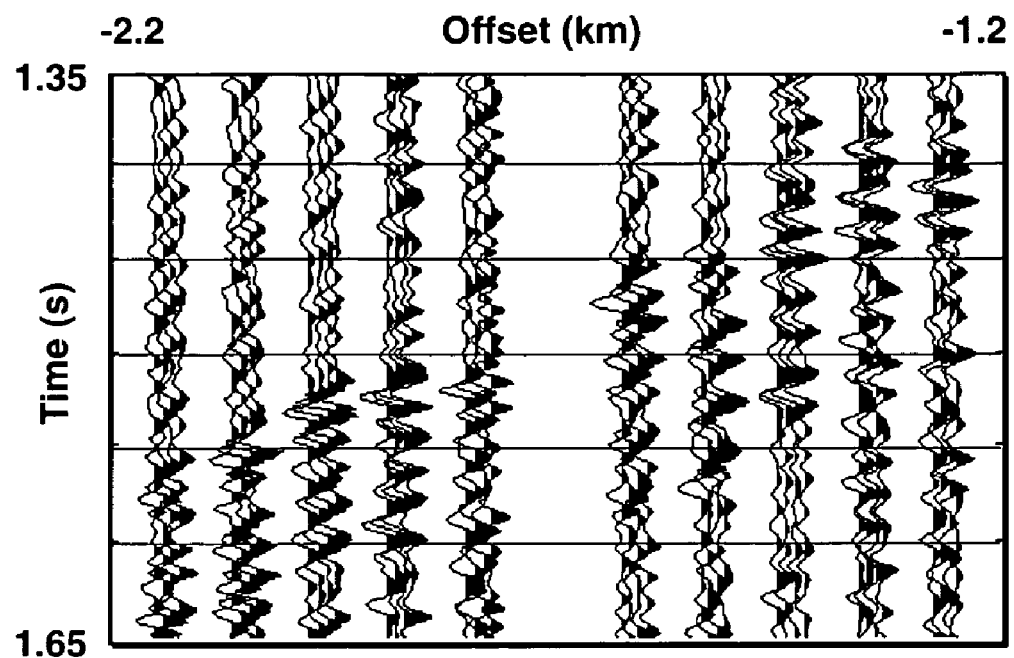
FIG. 12a depicts a raw CDP gather using four vibrators per station. The four neighboring traces would be automatically summed by source arrays according to a prior art method.
Figure 12B:
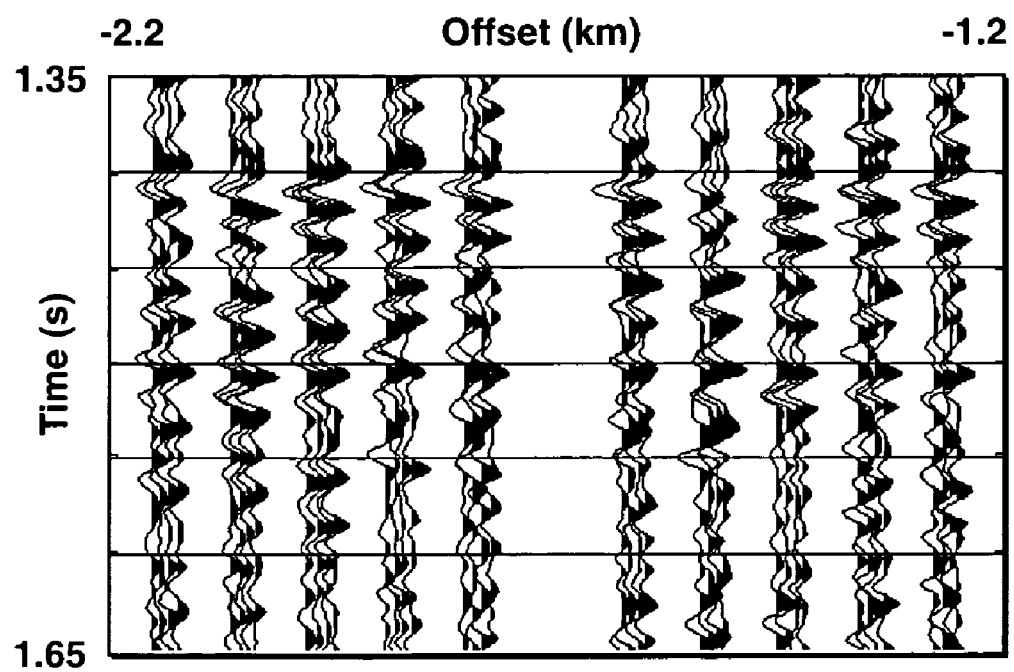
FIG. 12b depicts the results of applying an embodiment of the present invention to individual vibrators and applying static corrections and NMO to each vibrator record.
Figure 13A:
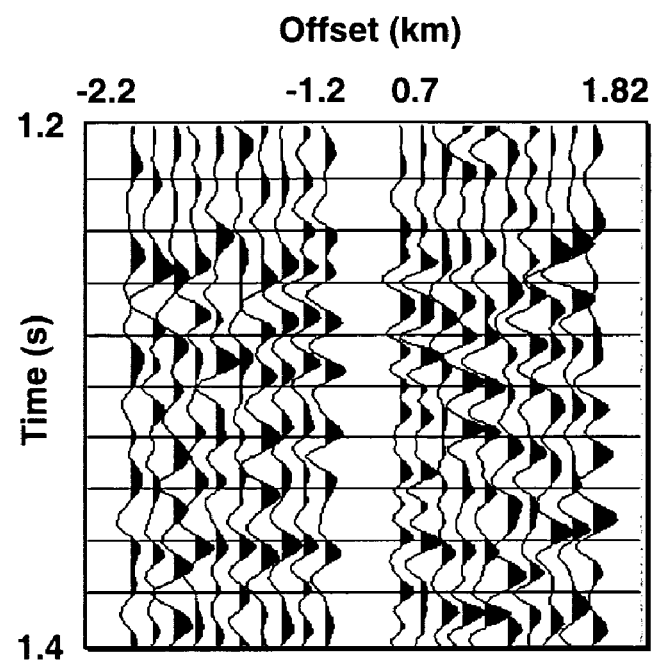
FIG. 13a depicts reflector mis-alignment for the prior art method of FIG. 12a and FIG. 13b depicts reflector alignment for the embodiment of FIG. 12b.
Figure 13B:
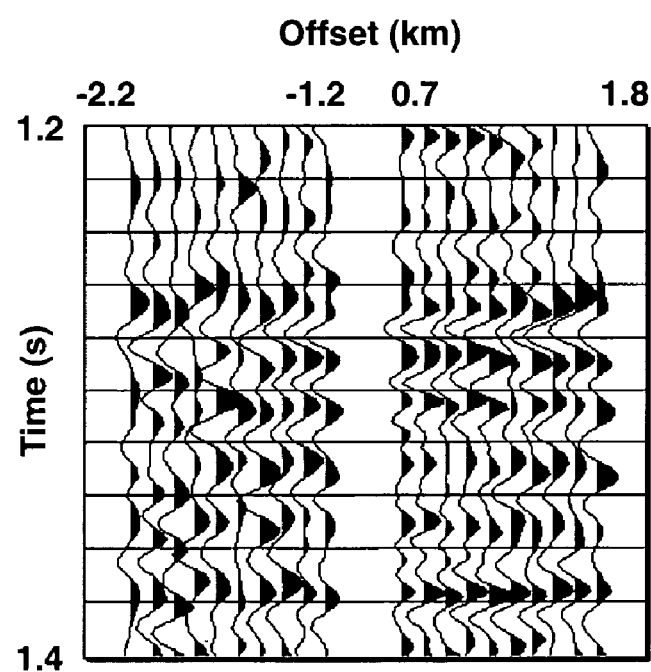

FIGS. 12-15 illustrate the improved seismic data processing results which derive from use of embodiments of the method of the present invention. FIGS. 12 and 13 demonstrate the advantages of the ability of embodiments of the present invention for use of unique source points after separation of the individual recordings from each vibrator. FIG. 12a shows a raw CDP gather using 4 vibrators per station. With conventional seismic data recording, the vibrators form a source array and data from each group of 4 traces are combined in the field as they are recorded. In processing, conventional static corrections and NMO moveout are applied. The resulting CMP gather in FIG. 13a clearly shows that the reflectors are not aligned. However, by separating the individual vibrators using an embodiment of the present invention, with static corrections and NMO applied to each separated vibrator record, as shown in FIG. 12b, the data which results, after forming the source array by summing the 4 traces depicted in the gather in FIG. 13b, shows much better reflector continuity as compared to FIG. 13a.

Figure 14A:
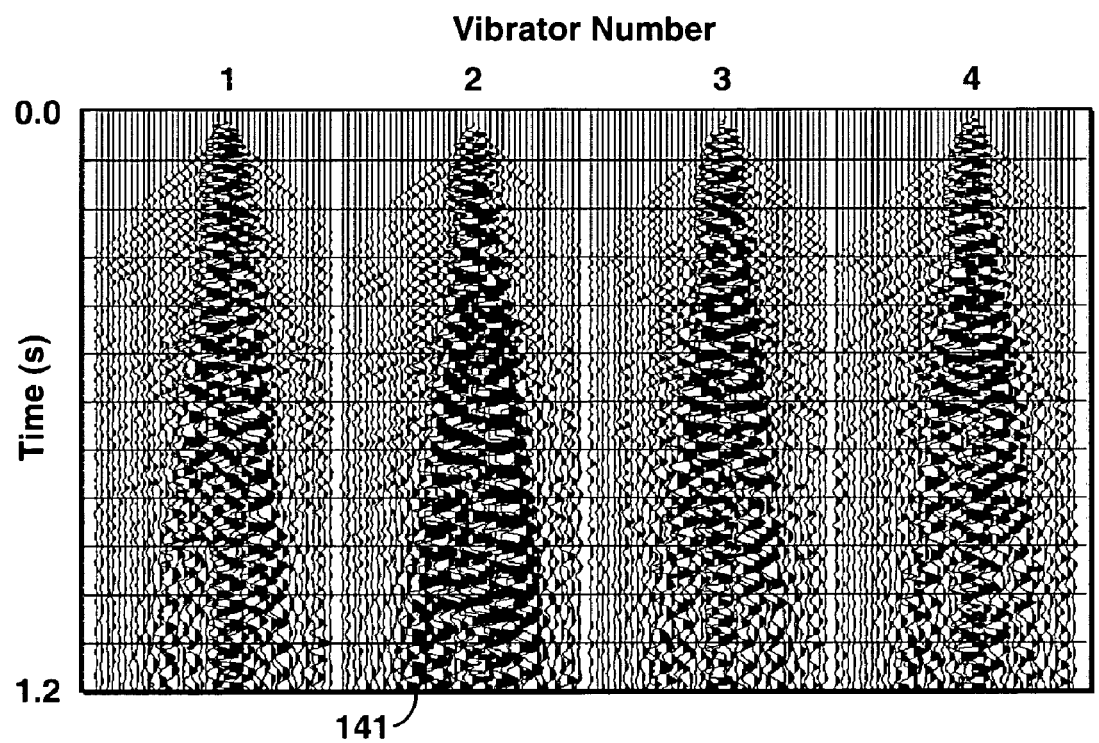
FIG. 14a depicts the results of noise suppression wherein data from four vibrators at a station are processed according to a prior art method.
Figure 14B:
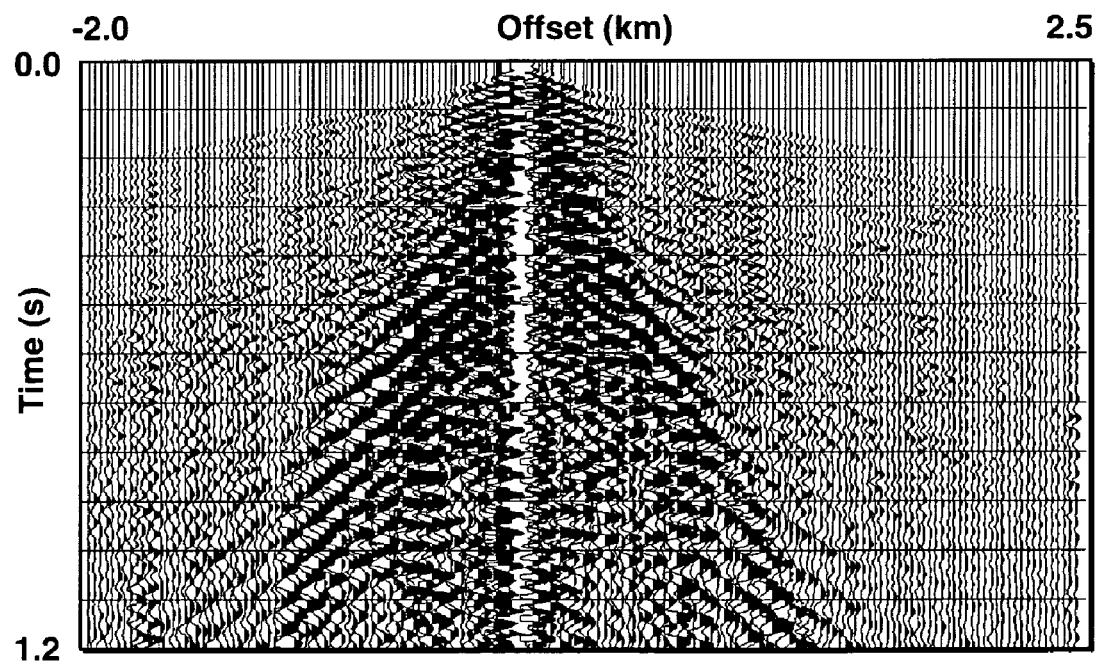
FIG. 14b shows data processed in a supergather according to an embodiment of the present invention in which individual source-receiver offsets are used.
Figure 15A:
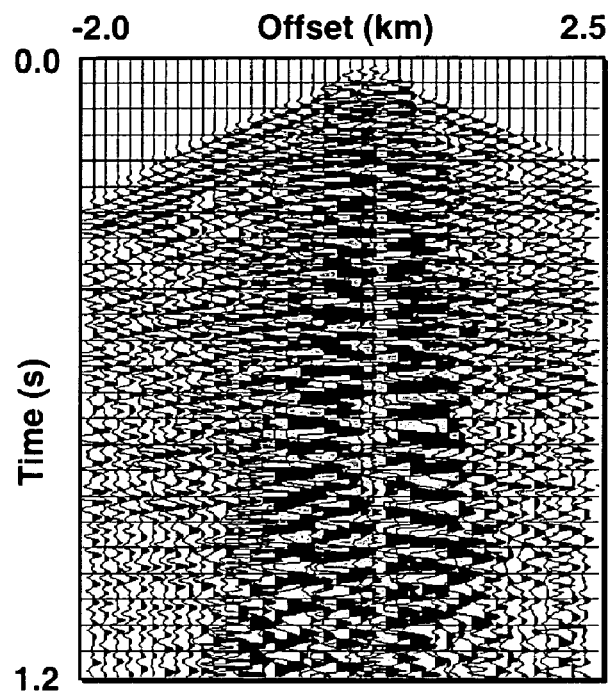
FIG. 15a shows obscured reflectors of the prior art method of FIG. 14a and FIG. 15b shows the visible reflectors according to the embodiment of the present invention of FIG. 14b.
Figure 15B:
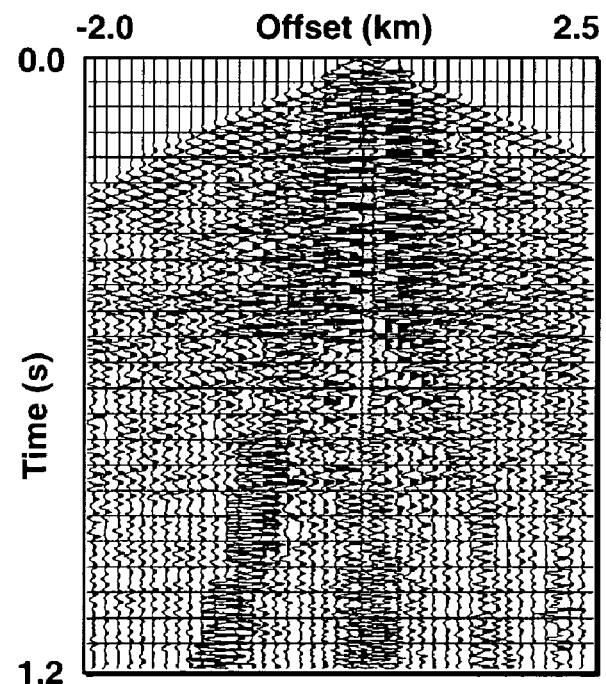

In addition, the present invention facilitates better noise suppression, as is illustrated in FIGS. 14 and 15. FIG. 14a shows the results of a prior art method involving 4 vibrators per station, and a large amount of aliased ground-roll noise 141 is present. When the data is summed, noise suppression techniques cannot remove much of the aliased ground roll without removing signal. The result is shown in FIG. 15a, in which reflectors are obscured by noise. In contrast, FIG. 14b shows arranging the data in a supergather using individual source-receiver offsets according to an embodiment of the method of the present invention. Much of the ground roll noise is no longer aliased, and can be removed prior to forming the source array. The result, shown in FIG. 15b, is data in which reflectors can be seen at near offsets, no longer obscured by the noise.

It should be understood that the preceding is merely a detailed description of specific embodiments of this invention. Other embodiments may be employed and numerous changes to the disclosed embodiments may be made in accordance with the disclosure herein without departing from the spirit or scope of the present invention. Furthermore, each of the above embodiments is within the scope of the present invention. The preceding description, therefore, is not meant to limit the scope of the invention. Rather, the scope of the invention is to be determined only by the appended claims and their equivalents.

I claim:

1. A method of processing seismic data generated by one or more seismic vibrators comprising the steps of
   (a) measuring a signal related to the vibrator motion;
   (b) computing a vibrator signature for said measured vibrator motion signal;
   (c) specifying a desired seismic data processing impulse response, wherein the high and low frequency portions of the amplitude spectrum of said impulse response have amplitude values less than corresponding amplitudes from the high and low frequency portions of the amplitude spectrum of said vibrator signature;
   (d) computing a deconvolution filter from the ratio of the desired impulse response and the computed vibrator signature;
   (e) processing said seismic data using said deconvolution filter.

2. The method of claim 1, wherein said vibrator motion signal is the vibrator ground force signal.

3. The method of claim 1, wherein said vibrator motion signal is approximated by a vibrator pilot signal.

4. The method of claim 1, wherein small values of an amplitude spectrum of said impulse response are set equal to a threshold value.

5. The method of claim 1, wherein small values of an amplitude spectrum of said impulse response are set less than a threshold value.

6. The method of claim 1, wherein the vibrator signature is computed from the time derivative of said ground force signal.

7. The method of claim 1, wherein said computation of said deconvolution filter involves an iteration in which zero phase and minimum phase impulse responses are analyzed to determine the suitability of said deconvolution filter to process high and low frequency data content in said seismic data.

8. The method of claim 1, wherein a plurality of seismic vibrators is used, and a resulting matrix of vibrator signatures is inverted and used to determine said deconvolution filter.

9. The method of claim 1, wherein a small amount of pre-whitening noise is added to all frequency values of an amplitude spectrum of said impulse response.

10. The method of claim 1, wherein a plurality of vibratory sources are used to generate seismic data and a plurality of detectors are used to record the seismic data, wherein each vibrator is excited with a frequency sweep, and further comprising measuring a vibrator motion signal for each vibrator.

11. The method of claim 10 wherein the plurity of vibrators are excited with a number of sweeps at least equal to the number of vibrators, and wherein a full solution involving all matrix components is generated by using one filter for all sweeps in a fully coupled derivation of a full deconvolution matrix solution, and further comprising separating the data according to the individual vibrators using said deconvolution matrix.

12. The method of claim 1 wherein the frequency sweep increases linearly in time.

13. The method of claim 1 wherein the frequency sweep decreases linearly in time.

14. The method of claim 1 wherein the frequency sweep is a nonlinear sweep.

15. The method of claim 1 wherein the frequency sweep is a random sweep.

16. The method of claim 10 wherein different vibrators are energized by different sweeps which are phase encoded.

17. The method of claim 10 wherein different vibrators are energized by sweeps in which one vibrator a time is energized by a sweep with a 90 degree phase rotation relative to the phases of the other vibrators.

18. The method of claim 10 wherein multiple sweeps are used and the sweeps include phase rotations of 360/N degrees where N is an integer.

19. The method of claim 17 wherein multiple sweeps are used and the sweeps include phase rotations of 360/N degrees where N is an integer.

20. The method of claim 10 wherein the different vibrators are energized by sweeps covering different frequency ranges at different times.

21. The method of claim 10 wherein the different vibrators are energized by sweeps which start at different times.

22. The method of claim 1 wherein the location of the detectors is selected form the group comprising detectors on the surface of the earth, detectors suspended in the water, detectors on the water bottom, detectors in a wellbore, and any combination thereof.

23. The method of claim 10 further comprising:
 (a) separating the data from each vibrator into individual records for each source location;
 (b) applying static corrections and differential normal moveout (NMO) correction to each source location;
 (c) summing the data for each source location.

24. The method of claim 10 further comprising (a) separating the data from each vibrator into individual records for each source location; (b) constructing supergathers to improve the noise separation techniques, and (c) summing the data for each source location.

25. The method of claim 10 further comprising separating the data into bins at small common depth point intervals and migrating the data thereby improving imaging and focusing.

26. A method of processing seismic data generated by at least two seismic vibrators with a number of sweeps at least equal to the number of vibrators comprising the steps of
 (a) measuring a vibrator motion signal for each vibrator;
 (b) measuring the seismic signal;
 (c) computing a vibrator signature for said measured vibrator motion signal;
 (d) specifying a desired seismic data processing impulse response, wherein the high and low frequency portions of the amplitude spectrum of said impulse response have amplitude values less than corresponding amplitudes from the high and low frequency portions of an amplitude spectrum of said vibrator motion signal;
 (e) computing a deconvolution matrix in the frequency domain that separates the earth response for each vibrator and replaces the individual vibrator signatures with the desired impulse response;
 (f) processing said seismic data and separating the data according to the individual vibrators using said deconvolution matrix.

27. The method of claim 26, wherein said vibrator motion is the vibrator ground force signal.

28. The method of claim 26 wherein said vibrator motion is approximated by a vibrator pilot signal.

29. The method of claim 26, wherein small values of an amplitude spectrum of said impulse response are set equal to a threshold value.

30. The method of claim 26, wherein small values of an amplitude spectrum of said impulse response are set less than a threshold value.

31. The method of claim 26, wherein the vibrator signature is computed from the time derivative of said ground force signal.

32. The method of claim 26, wherein said computation of said deconvolution filter involves an iteration in which zero phase and minimum phase impulse responses are analyzed to determine the suitability of said deconvolution filter to process high and low frequency data content in said seismic data.

33. The method of claim 26, wherein a small amount of prewhitening noise is added to all frequency values of an amplitude spectrum of said impulse response.

34. The method of claim 26 wherein the frequency sweep increases linearly in time.

35. The method of claim 26 wherein the frequency sweep decreases linearly in time.

36. The method of claim 26 wherein the frequency sweep is a nonlinear sweep.

37. The method of claim 26 wherein the frequency sweep is a random sweep.

38. The method of claim 26 wherein different vibrators are energized by sweeps which are phase encoded.

39. The method of claim 26 wherein different vibrators are energized by sweeps in which one vibrator a time is energized by a sweep with a 90 degree phase rotation relative to the phases of the other vibrators.

40. The method of claim 26 wherein multiple sweeps are used and the sweeps include in any order of phase rotations of 360/N degrees where N is an integer.

41. The method of claim 39 wherein multiple sweeps are used and the sweeps include in any order of phase rotations of 360/N degrees where N is an integer.

42. The method of claim 26 wherein the different vibrators are energized by sweeps covering different frequency ranges at different times.

43. The method of claim 26 wherein the different vibrators are energized by sweeps which start at different times.

44. The method of claim 26 wherein the location of the detectors is selected form the group comprising detectors on the surface of the earth, detectors suspended in the water, detectors on the water bottom, detectors in a wellbore, and a combination thereof.

45. The method of claim 26 further comprising:
 (a) separating the data from each vibrator into individual records for each source location;
 (b) applying static corrections and differential normal move-outs (NMO) to each source location;
 (c) summing the data for each source location.

46. The method of claim 26 further comprising constructing supergathers to improve the noise separation techniques.

47. The method of claim 26 further comprising separating the data into bins at small common depth point intervals and migrating the data thereby improving imaging and focusing.

* * * * *